(12) United States Patent
Roever

(10) Patent No.: US 6,714,257 B2
(45) Date of Patent: Mar. 30, 2004

(54) COLOR KEY PRESERVATION DURING SAMPLE RATE CONVERSION

(75) Inventor: Jens A. Roever, Cupertino, CA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 445 days.

(21) Appl. No.: 09/895,965

(22) Filed: Jun. 29, 2001

(65) Prior Publication Data

US 2003/0001973 A1 Jan. 2, 2003

(51) Int. Cl.[7] .............................. H04N 9/74; H04N 9/75
(52) U.S. Cl. ..................... 348/590; 348/591; 348/592
(58) Field of Search ................... 348/590, 591, 348/592, 593, 586, 589

(56) References Cited

U.S. PATENT DOCUMENTS

| | | | | |
|---|---|---|---|---|
| 4,602,286 A | * | 7/1986 | Kellar et al. | 348/597 |
| 4,875,097 A | * | 10/1989 | Jackson | 348/585 |
| 5,608,464 A | * | 3/1997 | Woodham | 348/578 |
| 6,525,741 B1 | * | 2/2003 | Klassen et al. | 345/589 |

FOREIGN PATENT DOCUMENTS

JP 11088892 3/1999

OTHER PUBLICATIONS

Keith, Jack, Video Demystified, 1996, pp. 387–425.

* cited by examiner

Primary Examiner—Michael H. Lee
(74) Attorney, Agent, or Firm—Michael J. Ure

(57) ABSTRACT

The color-keyed regions of a color-keyed image are extracted from the color-keyed image, and the color-keyed regions and the non-color-keyed regions are independently scaled. The independently scaled regions are subsequently merged to form a scaled color-key image with clearly distinguished color-keyed regions and non-color-keyed regions. To minimize the blurring of edges in the non-color-key regions, the non-color-key colors are extended into color-keyed regions after the color-keyed information is extracted from the color-keyed image. To minimize the encroachment of the scaled color-keyed regions into the scaled non-color-keyed regions of the scaled color-key image, the edges of the scaled color-key regions are sharpened by defining the color-keyed region as the region wherein each scaled/filtered color-key value exceeds a non-zero threshold value. To facilitate the use of existing memory and structure in images that are encoded using three components per pixel, such as RGB, YUV, etc., the extracted color-keyed regions are stored in the memory structure that is typically used to store an optional fourth component, such as a transparency or texture parameter.

16 Claims, 1 Drawing Sheet

COLOR KEY PRESERVATION DURING SAMPLE RATE CONVERSION

BACKGROUND OF THE INVENTION

1. Field of the Invention

This invention is related to the field of image processing, and in particular to the processing of image data that contains a key that identifies regions for inserting other image data.

2. Description of Related Art

Color keying, or chroma keying, is used when certain regions of an image or graphics window are to be replaced by different image or graphic information in a later processing step. For example, a "bluescreen" is often used as a background for a television announcer when the announcer is being recorded. A background image, corresponding, for example to "file footage" from a related story, is subsequently inserted into the image containing the announcer, to form a composite image containing the announcer in the foreground and the file footage in the background. Corresponding regions of the file footage background are inserted wherever the bluescreen color is detected in the image of the announcer. The particular color that is chosen as the replaced background color is termed a color key, and is generally selected to be easily distinguishable from colors that would be expected in the foreground image.

Luminance keying operates similarly, wherein the brightness level of regions of an image define whether to insert a replacement image in each region. Chapter 9 of the text "VIDEO DEMYSTIFIED", by Keith Jack, ©HighText Interactive, Inc., San Diego, Calif., presents various techniques for luminance and color keying, and is incorporated by reference herein.

Because color keying is more commonly used for forming a composite image of individual background and foreground image data, and for each of reference, the term color keying is used herein to refer to the process of distinguishing between regions of an image based on a value associated with one or more components of the data elements that form the image. In like manner, the term color-keyed is used herein to identify the scheme used to provide a means for identifying the insertion region of an image, even though any of a variety of techniques may be employed to provide this identification. The term color-keyed image is used to define the image that contains regions that are to be replaced, and the term background image is used to define the image that contains the replacement data, even though the inserted data may not form a 'background', per se. That is, for example, the color-keyed image may include a non-key colored background and a foreground object that contains the color key value. The insertion of the data from the "background image" in this example, effects an insertion of foreground image information into the color-keyed image. The term composite image is used herein to define the image that contains the insertion of the background image into the color-keyed regions of the color-keyed image.

As the field of image processing and image manipulation continues to expand, the need for flexible color keying schemes continues to grow. In particular, a need exists for allowing images from different data sources, at potentially different image scales, to be combined. A straightforward solution is to modify the scale of the background image to correspond to the scale of the color-keyed image, and then effect the color keyed merging. If the scale, or available resolution, of the desired output image is different from that of the color-keyed image, the composite image is appropriately scaled. Note, however that this scheme limits the effective resolution of the background image to the resolution of the color-keyed image, regardless of whether the available output resolution is finer than that of the color-keyed image. Preferably, each of the color-keyed image and the background image would be scaled to the desired output image scale before being merged, so that image resolution is not lost by constraining the resolution of the background image to match the resolution of the color-keyed image, or vice versa.

Changing the scale of a color-keyed image, however, may have an adverse effect on the identification of color-keyed regions. Most image scalers, commonly termed sample rate converters, include filters that provide each output sample as a weighted average of multiple input samples in the vicinity of the output sample. For example, if the image is being up-sampled, wherein more output samples are produced than input samples, each output sample value is based on an interpolation of the input sample values in the vicinity of the location of the output sample. If the image is being down-sampled, each output sample is an average of the input samples in the vicinity of the location of the output sample. This interpolation or averaging, which is required to prevent discontinuities and other anomalies in the scaled image data, provides an output value that is a blending of multiple neighboring input values. As such, values along the edges of color-keyed regions will be blended with values in the non-color-keyed regions, and the blended value will likely be a non-color-keyed value that is not present in the original image. If a composite image is filtered, there will be some color blending at the edges of the objects, but because the blended color is based on the colors on each side of the edge, it merely appears as a less-sharp edge. In the example of a blue-colored screen behind an announcer who is purposely not wearing this shade of blue, however, the blended value at the edge of the announcer will be a somewhat-blue color that differs from the color key value, and differs from the colors of the announcer's clothing or skin. The effect of this non-color-key bluish color at the edges of the color-keyed region is a visually apparent 'outline' of the announcer when the background image replaces the regions that match the color key value, but does not replace the non-color-key bluish color at the edges.

BRIEF SUMMARY OF THE INVENTION

It is an object of this invention to provide an apparatus and method that allows for the scaling and/or filtering of a color-keyed image that allows the replacement of the color-keyed regions with background image information, without introducing visible artifacts. It is a further object of this invention to provide an apparatus and method that allows for the scaling and/or filtering of a color-keyed image without introducing visible artifacts using existing video processing memory and structures.

These objects and others are achieved by extracting the color-keyed regions from a color-keyed image, and independently scaling the color-keyed regions and the non-color-keyed regions. The independently scaled regions are subsequently merged to form a scaled color-key image with clearly distinguished color-keyed regions and non-color-keyed regions. To minimize the blurring of edges in the non-color-key regions, the non-color-key colors are extended into color-keyed regions after the color-keyed information is extracted from the color-keyed image. To minimize the encroachment of the scaled color-keyed regions into the scaled non-color-keyed regions of the scaled color-key image, the edges of the scaled color-key regions are sharpened by defining the color-keyed region as the region wherein each scaled/filtered color-key value exceeds a non-zero threshold value. To facilitate the use of existing memory and structure in images that are encoded using three components per pixel, such as RGB, YUV, etc., the extracted color-keyed regions are stored in the memory structure that is typically used to store an optional fourth component, such as a transparency or texture parameter.

BRIEF DESCRIPTION OF THE DRAWINGS

The invention is explained in further detail, and by way of example, with reference to the accompanying diagrams wherein.

Throughout the drawings, the same reference numerals indicate similar or corresponding features or functions.

DETAILED DESCRIPTION OF THE INVENTION

Figure 1:
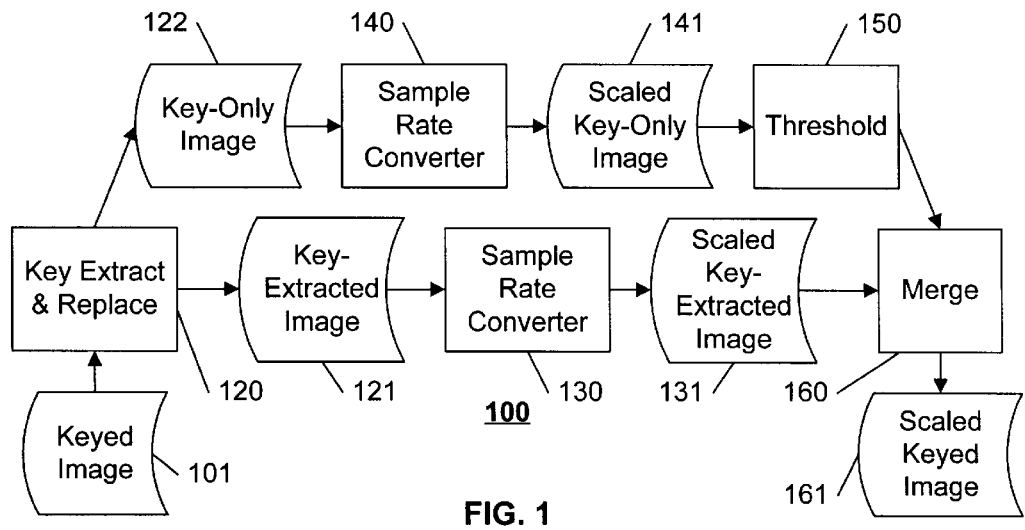
FIG. 1 illustrates an example block diagram of an image processing system in accordance with this invention.

FIG. 1 illustrates an example block diagram of an image processing system 100 in accordance with this invention. The image processing system 100 is configured to independently scale the color-key regions and the non-color-key regions in a color-keyed image 101, and to merge these independently scaled images to form a scaled color-key image 161.

A key extract and replace module 120 segregates the color-keyed image 101 into a color-key-extracted image 121 that contains only non-color-keyed picture elements (pixels) and a color-key-only image 122 that contains only color-keyed pixels. Each of these images 121, 122 are independently scaled, via one or more sample rate converters 130, 140 to produce scaled images 131 and 141, respectively. A merge device 160 merges these scaled images 131, 141 to produce the scaled color-keyed image 161. Although for ease of understanding, separate sample rate converters 130, 140 are illustrated, the same sample rate converter can be used to scale each of the images 121, 122.

As is common in the art, a sample rate converter 130, 140 typically includes a filter that determines each output sample as a function of multiple input samples in the vicinity of the output sample, as discussed above. As such, the edges of the color-keyed regions and the non-color-keyed regions in each of the scaled key-only 122 and key-extracted 121 images from a conventional sample rate converter 130, 140 will contain blended color values.

In a preferred embodiment of this invention, two techniques are employed to minimize the blending along the edges of the scaled color-keyed and non-color-keyed regions. The edges of the scaled non-color-keyed region in the scaled color-key-extracted image 131 retain the color value of the edges of the unscaled non-color-keyed regions in color-key-extracted image 121. And, the scaled color-keyed regions in the scaled color-key-only image 141 are sharpened to avoid encroachment into the scaled non-color-keyed regions of scaled color-key-extracted image 131.

To retain the color value of the edges of the non-color-keyed regions in the scaled key-extracted image 131, the pixel value used to replace the color-key value in the key-extracted image 121 is preferably selected such that the filter in the converter 130 has minimal effect on the color value. If, for example, a null, or zero, value is used as the replacement, then the values of the scaled pixels along the edge of the non-color-key regions of image 131 will be diminished as the zero values in the prior color-key region of image 121 are used in the determination of these scaled pixels. In a preferred embodiment, to avoid the distortion of the color values along the edge of the non-color-key regions of the image 131, the value of the non-color-key region of the image 121 is extended into the prior color-key region of image 121. By extending the color value at the edges of the non-color-key regions into the prior color-key regions, the output pixel value that forms image 131 is solely dependent upon the values contained in the non-color-key regions of image 121. In a preferred embodiment, to minimize computational complexity, the value that replaces each color-key pixel in the image 121 is the value of the horizontally-closest non-color-key pixel. That is, for each horizontal line of the image 121, each non-color-key value at the edge of the color-keyed region is extended half-way into the adjacent prior color-keyed region, from the left and the right of the prior color-keyed region of image 101.

Other techniques for estimating a color in the color-keyed regions of image 101 for forming the key-extracted image 121 so as to minimize the distortion of color value at the edge of the non-color-keyed regions of the image 131, including interpolation and averaging, will be evident to one of ordinary skill in the art in view of this disclosure.

In an alternative embodiment, a uniquely identifiable value is used as the color-key-replacement value for the color-keyed pixels in the image 121, and the sample rate converter 130 is specifically configured to ignore pixels having this unique value in the determination of an output pixel value for forming the image 131. The uniquely identifiable value is selected as one that is not likely to appear in the non-color-keyed regions of image 121, so as to unambiguously identify the color-keyed regions. In such an embodiment, the unique color-key-replacement value may be selected to be the same value as the color-key value, thereby obviating the need to "replace" the pixel values in the color-keyed regions of the image 121, per se. Inclusion of the replacement step, however, provides the flexibility of using independent color-key values and color-key-replacement values in the images 101 and 121, respectively.

In accordance with this aspect of the invention, because the color value within the extracted color-keyed region of image 121 is either a color from the edge of the non-color-keyed region, or a color value that is ignored during the scaling process, the edges of the non-color-keyed regions in the scaled image 131 will exhibit minimal distortion from a blending of the color-key color into the non-color-keyed regions.

To avoid the encroachment of the scaled color-key regions of image 141 into the scaled non-color-key regions 131 when forming the scaled color-keyed image 161, the edges of the scaled color-key regions of image 141 are sharpened by comparing each scaled pixel value to a non-zero threshold value. The color-key-only image 122 contains zero values except in each color-key region. As noted above, the filtering that is associated with a scaling process of a sample rate converter 140 will diminish the value of the pixels in the vicinity of the edges of a region, because the pixel value is determined based on neighboring zero-valued pixels, producing a 'blurred' edge that contains a blended color value. By comparing each pixel value in the scaled color-key-only image 141 to a non-zero threshold value, a well-defined edge of the scaled color-key regions is created. That is, at an edge, the pixel values will taper-off from a value corresponding to the color-key to the value corresponding to the non-color-key. By defining the color-key region as the region containing pixels above a given threshold value, the pixels at the end of the taper adjacent the non-color-key region will not be included in the color-key region that is merged with the non-color-key regions of the scaled color-key-extracted image 131. Other techniques for sharpening the edges of the scaled color-key regions of the scaled color-key-only image 141 will be evident to one of ordinary skill in the art.

In a preferred embodiment of this invention, memory space and structures that are common in conventional image processing systems are utilized wherever feasible. For example, many image processing systems are configured to support color spaces that include up to four components for each pixel value. For example, most graphic systems use three-components to define the color of a pixel, and another component to define, for example, the transparency, or opacity, of the color. Often, this fourth component is unused for conventional image processing tasks, such as the merging of existing images. If the keyed image 101 is in a conventional three-component color space, such as RGB (red (R), green (G), and blue (B) components) or YUV (luminance (Y) and two chrominance (U, V) components), and the processing system is configured to support four components per pixel, the key-only image 122 is stored as the fourth-component, commonly termed the alpha (A) component. By storing the key-only image 122 as the fourth-component of a conventional image processing memory structure, a number of advantages are achieved. The sample rate converter in a conventional four-component color space system is generally configured to scale each of the component values independently. Therefore, by storing the color-key-only image 122 as the fourth component value, the sample rate conversion process corresponding to the converter 140 of FIG. 1 is automatically provided by the conventional sample rate converter 130 that scales the color-key-extracted image 121. Also, by storing the color-key-only image as the fourth component value of a conventional memory structure, the color-key-only image 122 and scaled color-key-only image 141 will occupy existing memory space and structures, and no additional memory is required for this embodiment of the invention. These and other system optimizations will be evident to one of ordinary skill in the art in view of this disclosure, and additional options are presented below.

Figure 2:
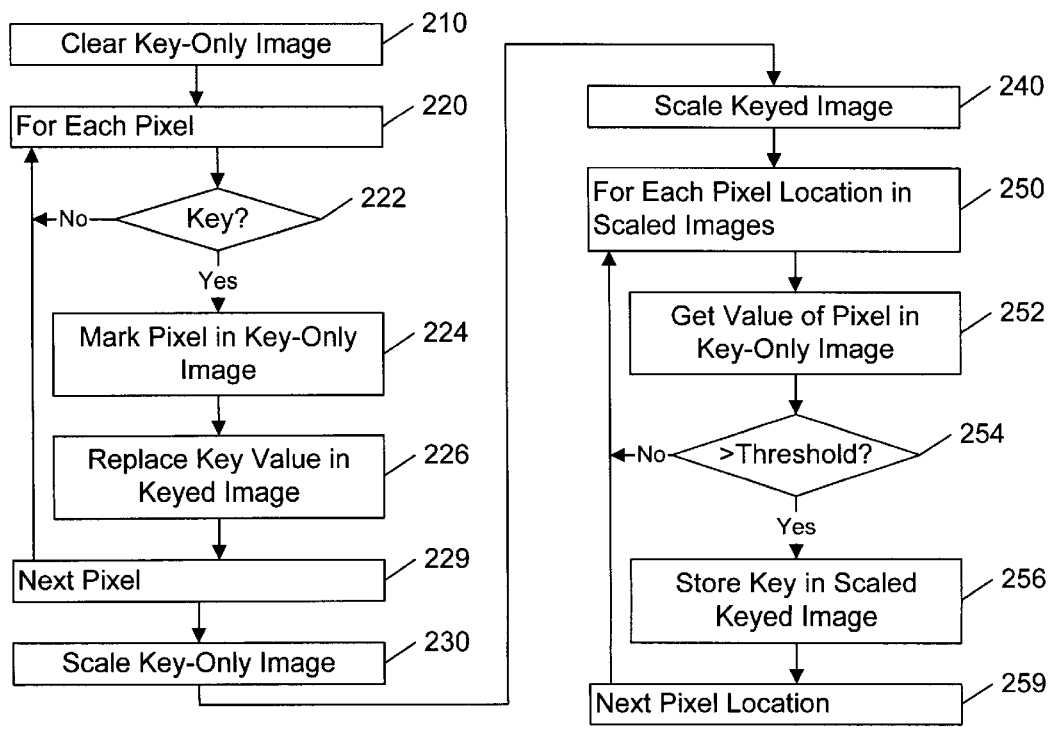
FIG. 2 illustrates an example flow diagram of an color-key image scaling and merging process in accordance with this invention.

FIG. 2 illustrates an example flow diagram of color-key image scaling and merging process in accordance with this invention. This flow diagram is presented for illustration and ease of understanding. One of ordinary skill in the art will recognize that different sequences and steps may be employed to produce a similar result. For ease of understanding, the following description includes references to items in FIG. 1; each of the items in FIG. 1 have an initial digit of "1", while the items of FIG. 2 have an initial digit of "2".

At step 210, the memory space that is allocated to store the color-key-only image 122 is cleared. Each pixel in the color-keyed image 101 is processed, via the loop 220–229 to identify and replace each color-key pixel. If, at 222, the pixel value corresponds to the color-key value, the corresponding pixel in the color-key-only image 122 is marked as such, at 224. Any of a number of techniques can be applied to mark each pixel of each color-key region. In a preferred embodiment wherein a fourth component of the conventional pixel color space is used, the corresponding fourth component value is set to a maximum value for each color-key pixel, and to a minimum value for each non-color-key pixel. Alternatively, a single bit could be used to mark each corresponding pixel in the color-key-only image 122. In some formats, the fourth component of the encoding comprises a single bit. For example, a common format for encoding a three-component pixel value, such as red-green-blue (RGB) components, is to encode each component as a five-bit value. This encoding leaves a single bit available, when the pixel value is stored in a sixteen-bit word. This remaining single bit is often used to distinguish opaque and transparent colors, and the four component encoding is termed RGBa, and corresponds to a 5-5-5-1 bit encoding of the "R", "G", "B", and "a" component values.

The color-key value in the keyed image 101 is replaced in the key-extracted image 121. Note that, in a preferred embodiment, the same memory space is used to store the keyed image 101 and the key-extracted image 121. That is, the color-key pixels in the keyed image 101 are replaced, and the non-color-key pixels are unchanged, thereby modifying the keyed image 101 to produce the key-extracted image 121, rather than creating the key-extracted image 121 as a separate image. The value chosen to replace the color-key value, as discussed above, is preferably the closest non-color-key value to the color-key pixel. Other replacement values may also be used. For example, to avoid needing a "look-ahead" function for determining a closest non-color-key value as the replacement value, a "last" non-color pixel value before the color-key region on each line of the image may be used as the replacement value. Alternatively, as also discussed above, if the scaling process 130 is configured to ignore the color-key value, step 226 is eliminated.

After all pixels in the keyed image are processed to create a color-key-only image 122 and a color-key-extracted image 121 (or modified 101), the color-key-only image 122 and the color-key-extracted image 121 (101) are scaled, at 230, 240. As noted above, if the color-key-only image 122 is stored as the fourth component of a conventional image data structure, the steps 230, 240 are accomplished as a single step using a conventional four-component scaler. If a single bit value is used to identify the color-key regions of an image, the value of a scaled pixel at the edge of the color-key region is determined by comparing the "phase" of the scaled pixel (i.e. the location of the scaled pixel relative to the color-key and non-color-key pixels to the left and right of the scaled pixel) to a threshold value. For example, a threshold of 0.5 would correspond to a conventional "rounding" of the value to the nearest pixel.

Each pixel location in the scaled color-key-only 141 and scaled color-key-extracted 131 images is processed, via the loop 250-259 to produce the scaled color-keyed image 161. As in the input process, the same memory space that is used to contain the scaled color-key-extracted image 131 is used to contain the scaled color-keyed image 161. That is, the merged output image 161 is formed by leaving the scaled color-key-extracted pixel values in the image 131 unchanged, and overwriting the pixel locations in the image 131 corresponding to the color-key pixels in the scaled color-key-only image 141 with the color-key value.

At 252, the value of the pixel in the scaled color-key-only image 141 is retrieved from memory, and compared to a threshold value, at 254. If the value of the pixel exceeds the threshold, the color-key value is stored in the corresponding pixel location in the scaled color-key-extracted image 131, at 256, thereby forming a merged color-key image 161. Pixel values below the threshold are ignored, and the corresponding pixel locations in the color-key-extracted image 131 are unaffected, thereby minimizing the encroachment of the scaled color-key regions in the scaled color-key-only image 141 into the non-color-key regions of the merged color-key image 161.

The foregoing merely illustrates the principles of the invention. It will thus be appreciated that those skilled in the art will be able to devise various arrangements which, although not explicitly described or shown herein, embody the principles of the invention and are thus within its spirit and scope. For example, each of the techniques employed to minimize the blending of pixel values at the edges of the non-color-key regions can be independently, and optionally, employed. For example, if the potential encroachment of the color-key region into the non-color-key regions is not deemed significant, the thresholding step 150 can be eliminated. Similarly, if the diminishment of the intensity of the colors along the edges of the non-color-key regions is not deemed significant, the values of the extracted color-key regions can be set to zero, or other color-neutral (i.e. gray) value, rather than having to determine the nearest non-color-key value as the substitute value. In like manner, if the scaled color-key regions in the scaled color-key-only image 141 is assured to encroach the non-color-key regions, by setting a very low, or zero, threshold value, and effectively cover any blended edges of the non-color-key regions, the color-keyed image 101 can be scaled directly, without replacing the color-key values, eliminating the step 226 in FIG. 2. These and other system configuration and optimization features will be evident to one of ordinary skill in the art in view of this disclosure, and are included within the scope of the following claims.

I claim:

1. An image processing system comprising:
a key extractor that is configured to create a key-only image from a keyed image,
the keyed image having one or more key regions that are configured to identify regions in the keyed image that are intended to be replaced by other image information, and
the key-only image having identified regions corresponding to the key regions of the keyed image;
a scaler that is configured to independently scale the keyed image and the key-only image to produce a scaled keyed image and a scaled key-only image; and
a merger that is configured to merge the scaled keyed image and the scaled key-only image.

2. The image processing system of claim 1, wherein
the scaler includes a filter that provides output pixel values forming the scaled images as a blend of multiple input pixel values, and
the key extractor is further configured to replace pixel values in the one or more key regions with a substitute value that is intended to minimize blending at edges of non-key regions caused by key pixel values within the key regions.

3. The image processing system of claim 2, wherein
the substitute value of each replaced pixel value corresponds to one of:
a value of a nearest non-key pixel value,
a value of a horizontally-nearest non-key pixel value,
a value of a prior determined non-key pixel value,
a neutral value, and
a predetermined value.

4. The image processing system of claim 1, wherein
the scaler includes a filter that provides output pixel values forming the scaled images as a blend of multiple input pixel values, and
is configured to blend only input pixel values that do not correspond to a defined key-replacement value.

5. The image processing system of claim 1, wherein
the merger is configured to merge the scaled keyed image and the scaled key-only image by comparing each pixel value in the scaled key-only image to a threshold value and replacing a corresponding pixel value in the scaled key image with a defined key value if the pixel value exceeds the threshold value.

6. The image processing system of claim 1, wherein
the scaler is configured to compare a phase of a pixel at an edge of the one or more key regions in the scaled key-only image to a threshold value, to determine a value for the pixel in the scaled key-only image.

7. The image processing system of claim 1, wherein
the keyed image is encoded using a three-component color-space,
the key-only image is encoded as a fourth component corresponding to the keyed three-component color-space, and
the scaler is configured to simultaneously scale the keyed image and the key-only image via a four-component color-space scaling.

8. The image processing system of claim 1, wherein
the keyed image corresponds to a color-keyed image.

9. A method of scaling a keyed image comprising:
creating a key-only image corresponding to key regions in the keyed image,
scaling the key-only image to form a scaled key-only image,
scaling the keyed image to form a scaled keyed image, and
merging the scaled key-only image and the scaled keyed image.

10. The method of claim 9, further including:
replacing pixel values in the key regions in the key image to minimize distortion of edges of non-key regions during the scaling of the keyed image.

11. The method of claim 10, wherein
the pixel values in the key regions are replaced by values of pixels beyond the key regions.

12. The method of claim 9, wherein
merging the scaled key-only image and the scaled keyed image includes:
comparing each pixel value of a plurality of pixel values in the scaled key-only image with a threshold value, and
replacing a corresponding pixel value in the scaled keyed image with a defined key value.

13. The method of claim 9, wherein
scaling the key-only image includes
comparing a phase of each pixel at an edge of the key regions to a threshold value to determine a corresponding value for each pixel at the edge of the key regions.

14. The method of claim 9, further including:
storing the key-only image as a fourth component of a four component color-space that includes the keyed image as three components of the four component color-space, and wherein
scaling the key-only image and the keyed image is effected as a simultaneous scaling of a four component color-space.

15. The method of claim 9, further including:
sharpening edges within the scaled key-only image before merging the scaled key-only image and the scaled keyed image.

16. The method of claim 9, wherein
the keyed image corresponds to a color-keyed image.

* * * * *